April 18, 1961  R. K. PETRY  2,980,575
RESILIENT SURFACE COVERING AND PROCESS THEREFOR
Filed Oct. 18, 1957
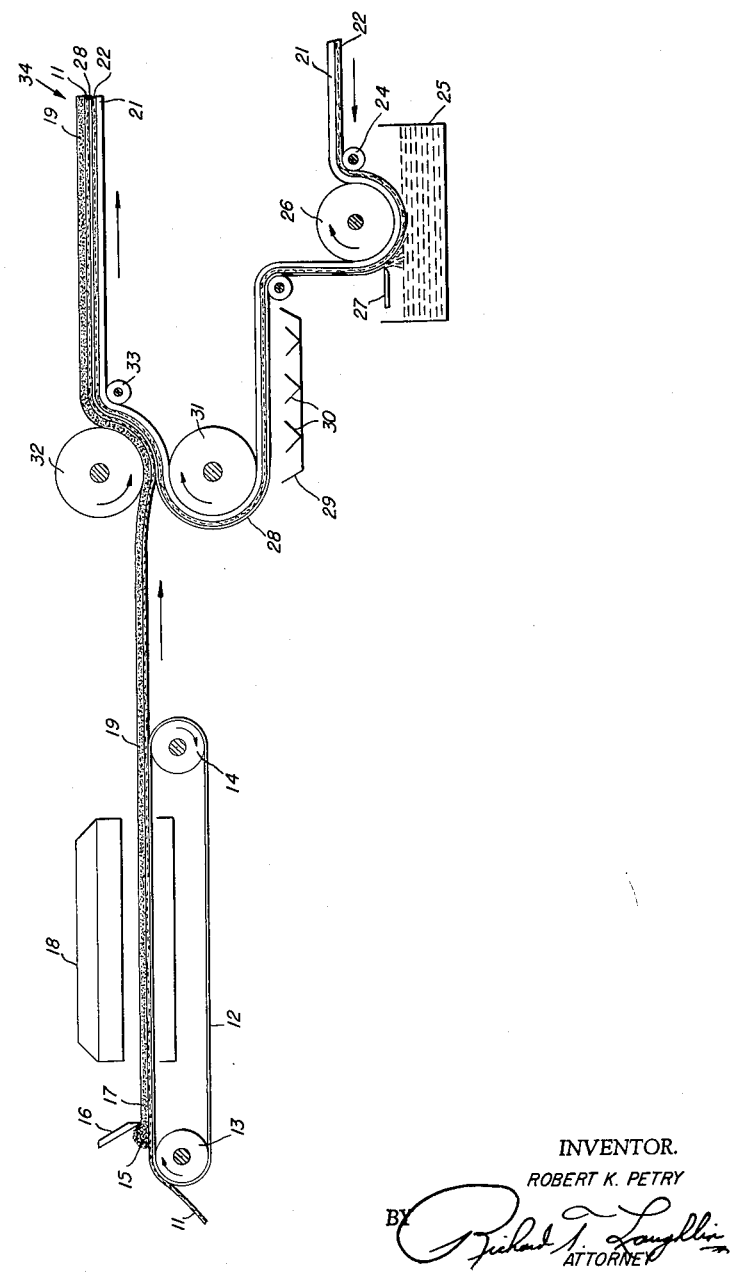
INVENTOR.
ROBERT K. PETRY
BY
ATTORNEY

United States Patent Office 2,980,575
Patented Apr. 18, 1961

2,980,575
RESILIENT SURFACE COVERING AND PROCESS THEREFOR

Robert K. Petry, Mountain Lakes, N.J., assignor to Congoleum-Nairn Inc., Kearny, N.J., a corporation of New York Filed Oct. 18, 1957, Ser. No. 690,927

6 Claims. (Cl. 154—138)

This invention relates to smooth surface coverings useful for floors, walls and the like and particularly to surface coverings bearing a resilient foam backing and to a process of producing such products.

Smooth surface coverings bearing a layer of decorative and wear resisting composition applied to and formed on an impregnated felted fibrous backing are well known and widely used as coverings for floors, walls and the like. The wearing surface of such products can be formed in many ways, such as pressing, extrusion, calendering and printing in the production of such well known products as printed felt base, linoleum, vinyl plastic flooring and the like. Such products are particularly useful as floor coverings since their smooth wearing surface can easily be cleaned. The presence of the felted fibrous backing, besides being a base upon which the decorative layer is formed during manufacture, imparts a slight measure of resilience to the product. The resilience created by a thin layer of impregnated felt is only slight in comparison to that of well-known foamed rubber and plastics and considerable work has been directed toward incorporating a foam backing in smooth surface coverings.

A method of producing a foam backed resinous composition product useful as a substitute for leather has been suggested. The method involves coating a layer of foam rubber upon a fabric, vulcanizing the rubber and thereafter applying to the fabric a layer of thermoplastic resinous composition. This method is not always suitable for preparing a foam backed surface covering having a wearing surface of the type conventionally applied to a felt backing. For example, in the manufacture of linoleum, the composition is sheeted, bonded to a backing and cured at temperatures up to 180° F. for long periods of time. The use of a layer of foam applied to a fabric as the backing in the cure of linoleum would result in destruction and degradation of the foam in the curing ovens. Similarly vinyl composition is frequently applied to a backing in the form of granules and pressed at high temperatures and pressures to produce a product with the appearance of terrazzo. The foam structure would be destroyed and thus rendered ineffective as a result of the pressing operation.

Another method of applying a foam backing layer to a felt-backed surface covering product is to laminate a preformed sheet of foam directly to the back of the product. This technique has not met with great success. There are many problems involved in preparing and handling a sheet of foam in the thickness desired for floor covering purposes. For economic and handling reasons, the foam backing on a smooth surface covering can not exceed 0.100 inch in thickness and normally is less than 0.050 inch thick. Such a thin foam sheet is extremely weak and readily stretches and tears when handled.

A further method of applying a layer of foam to a surface covering product is to coat a liquid foam composition directly upon the back of a conventional felt-backed surface covering. The composition can be cast either as a foam or as a clear thin layer using a resinous composition containing a blowing agent which decomposes under the influence of heat to liberate a foam producing gas. In either case, heat treatment of the layer is necessary. Where a foam rubber layer is cast, heating is necessary to vulcanize the rubber. In the case of a thermoplastic resinous composition, the layer must be heated to fuse the resin. Also, where a chemical blowing agent is used, the composition must be heated to a temperature sufficient to completely decompose the blowing agent. Temperatures of this heat treating step can be as high as 400° F. When a foam composition is applied to the back of a surface covering product and thereafter heated, the entire product including the decorative wearing surface is subjected to the high temperature conditions of the heat treating step. This can have a detrimental effect on the decorative wearing surface since the composition can become softened, thereby causing the decoration to become smeared, and also can actually become degraded. Thus, such a method is not particularly desirable. A further disadvantage of this method is the cost of waste which results from faulty foaming. There are numerous problems involved in applying a thin layer of foam to a surface and considerable waste is to be anticipated in such an operation. Since the foam is applied directly to the back of the surface covering product is is apparent that any waste will involve the entire product. This means that all the costs expended in producing the original surface covering are lost.

It is an object of the invention to provide a highly resilient foam backed surface covering.

Another object of the invention is to produce such a product without distortion or degradation of the decorative wearing surface.

A further object of the invention is to produce such a product by a method wherein waste resulting from the foam application step does not require scrapping the entire product.

A still further object of the invention is to produce a foam backed surface covering by a method that does not result in degradation of the foam during manufacture. Other objects and the advantages of the invention will appear hereinafter.

In accordance with the invention a decorative surface covering having an undistorted decorative wearing surface and a highly resilient foam backing is produced by applying a foam layer to a felt sheet and laminating the side of the felt sheet opposite that bearing the foam to the backing of a felt backed decorative surface covering thereby minimizing costs of waste and insuring good control of product decoration and foam structure.

The invention will be described with reference to the drawing which illustrates one embodiment of the method of producing a highly resilient decorative surface covering in accordance with the invention. With reference to the drawing, a sheet 11 of felt is carried by a conveyor belt 12 which is driven by wheels 13, 14. A mass of whipped foam 15 is formed by a doctor blade 16 into a thin uniform sheet of foam upon a surface of the felt sheet. The motion of the conveyor belt carries the mass through an oven 18 to yield a cured and vulcanized foam layer 19 applied to and formed on the felt.

A conventional felt backed surface covering bearing a layer of decorative and wear resisting composition 21 applied to a felt backing 22 passes over a roll 24 and under a roll 26 so that the exposed surface of the felt is coated with an adhesive layer, a supply of which is maintained in bath 25. Excess adhesive is removed from the felt by means of a doctor blade 27. The adhesive coating 28 is dried and activated by passing through an oven 29 bearing radiant heating lamps 30. The two felt surfaces are adhesively bonded in a laminating unit made up of rolls 31, 32. The laminated product is withdrawn from the laminator over a roll 33 and comprises a decorative wearing surface 21, two felt layers 22, 11 adhesively bonded together and a layer of vulcanized foam backing 19.

There are numerous resinous compositions which are capable of being formed into a thin foam layer. The foam layer formed on the felt in accordance with the invention has a thickness of less than 0.1 inch and preferably has a thickness between 0.04 and 0.06 inch. The composition is applied by any of the conventional techniques of coating such as roller coating, doctor blade coating and the like. The composition, therefore, must be of satisfactory fluidity to be coated into a uniform film. The resin in the composition can be dispersed in fine particles in a liquid dispersion medium to form an emulsion or can be a solution of resin in a solvent. Foaming can occur either prior to application of the composition to the felt, after its application, or in some cases, foaming can occur simultaneously with the application of the composition to the felt.

A particularly effective resinous composition which can be used in the formation of a thin layer of foam is rubber latex. The formulation of a rubber latex is well known in the art. The rubber is in the form of finely divided particles dispersed in water in the presence of emulsifiers, vulcanizing and aging ingredients, pigments and fillers. The rubber can be either natural rubber of any of the large group of materials classified as synthetic rubber, such as butadiene-styrene copolymer, polymerized chloroprene and the like. A conventional rubber latex can be foamed by shipping a substantial volume of air into the latex to form a multiplicity of minute air bubbles uniformly distributed throughout the mass. Alternately, the foam can be made by incorporating any of the well known chemical blowing agents in the latex. Typical blowing agents include inorganic carbonates and bicarbonates such as sodium bicarbonate and ammonium carbonate which decompose in the presence of acid to liberate carbon dioxide, inorganic nitrogen containing compounds such as sodium nitrite and ammonium nitrite which decompose to liberate nitrogen and organic compounds containing the >N—N< or —N=N— linkages such as urea, derivatives of urea, derivatives of azonitrile, derivatives of azodicarboxylic acids, derivatives of hydrazine and organic sulfonic acids such as P,P' oxybis (benzene sulfonyl hydrazide) and the like which decompose when heated to liberate nitrogen. It is conventional to add to the foam, when the foaming operation is complete, gelling or setting agents such as sodium silicofluoride so that the foam will not collapse prior to vulcanization. When a foam rubber latex of the type described is used in the preparation of products in accordance with the invention, a uniform layer of foam is cast upon a sheet of felt and the product is then passed through an oven maintained at a temperature sufficient to vulcanize the rubber. Normal vulcanizing temperatures are in the range from 200° F. to 275° F.

A second class of resinous composition which can be foamed to produce products in accordance with the invention is a dispersion of a thermoplastic resin. A thermoplastic resinous dispersion in water can be prepared in the same manner as a conventional rubber latex and this dispersion can be mechanically or chemically foamed and cast on felt as a thin foam layer. Alternately, a thermoplastic resin can be dispersed in the form of fine particles in a compatible plasticizer to produce a composition known in the art as a plastisol. Such plastisols can be blended with blowing agents which decompose when heated to their decomposition temperature to liberate a large volume of gas. Organic compounds containing the N—N or —N=N— linkages which decompose to liberate nitrogen as disclosed in connection with preparation of a foam rubber latex are particularly useful as blowing agents in foaming a thermoplastic resinous plastisol composition. Alternately, a plastisol can have air incorporated in the mass by mechanical means and the shipped mass applied to the felt sheet in the same manner described in connection with use of a foam rubber latex. Where chemical blowing agents are used in a thermoplastic resinous plastisol composition, the unblown plastisol is cast upon the felt in a thin uniform layer. The felt is then subjected to heat which decomposes the blowing agent and simultaneously fuses the plastisol to produce a fused thermoplastic foam layer upon the felt.

Any thermoplastic resin which can be dispersed in a liquid medium can be used in the preparation of a foam layer in production of products in accordance with the invention. Such thermoplastic resins as the polymers of vinyl chloride, vinyl acetate, vinylidene chloride, ethylene, acrylic acid, ethyl methacrylate, methyl methacrylate, ethyl acrylate and the like, copolymers of these monomers with each other and other monomers copolymerizable therewith and mixtures of polymers can be used. Vinyl chloride polymers, either homopolymers or copolymers containing at least 60 percent vinyl chloride, are particularly effective as resins useful in formulating foamable plastisols. The vinyl chloride polymers should preferably have a specific viscosity of between 0.17 and 0.31 as measured in a solution of 0.20 grams polymer in 100 milliliters of nitrobenzene at 20° C.

Useful plasticizers for the thermoplastic resin are esters of straight and branched chain alcohols with aliphatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di-(2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. Plastisols of thermoplastic resins normally contain from 50 to 150 parts plasticizer per 100 parts resin.

The polyurethanes form another class of resin which can readily be foamed and used in the invention. A polyurethane is the reaction product of a polyisocyanate with a reactant containing two or more active hydrogen atoms, such as a glycol, a polyester and the like. In the preparation of a polyurethane, a solution of polyisocyanate is mixed with a solution of the active hydrogen containing molecule in the presence of a small amount of water immediately prior to the coating step. When the solutions are mixed, the polymerization reaction starts and the water reacts to liberate carbon dioxide which expands the coating into a foam. Subsequently, the layer is subjected to heat in order to cure and crosslink the polyurethane to produce a foam structure with the desired properties of strength and flexibility.

The density of the foam layer applied to the felt sheet varies in accordance with the particular resinous composition used to form the foam. A low foam density is desirable from a cost standpoint, but low density foams can be undesirable from the standpoint of weakness with the resulting tendency to be permanently deformed by heavy loads. A foam with high density, although not subject to permanent indent, is costly and has poor resilience. In general, a range of 6 to 30 pounds per cubic foot gives satisfactory foam properties. Foam rubber compositions are particularly effective since they can be highly filled (up to 100 parts filler per 100 parts rubber) which decreases the cost and also imparts resistance to permanent deformation. Foamed rubber having a density of 12 to 20 pounds per cubic foot is particularly effective as a thin foam backing layer in producing products in accordance with the invention.

The felt backing on which the foam is applied is a felted cellulose fibrous sheet impregnated with a water proofing and strengthening saturant. The sources of cellulose can include cotton or other rags, wood pulp, paper boxes or mixtures thereof in any proportions. In addition, fillers such as wood flour can be used. Any of the conventional techniques of sheet formation can be used as for example, a Fourdrinier or cylinder paper machine. Other fibrous materials in addition to cellulose can be used including those of animal and mineral origin.

Felted cellulose fibrous sheets as produced by conventional sheet forming techniques are unsatisfactory for use in surface coverings due to their poor water resistance. In addition they lack sufficient strength to withstand the strains of processing. The factor of strength is particularly important since the thin layer of foam cast upon the felt has no appreciable strength of its own. The felt should not only be strong and water-proof, but it also should be resistant to tearing and have appreciable strength when bent.

Strength and water resistance can be imparted to a felt sheet by impregnation. The particular impregnant used must not only impart the characteristics of strength and water resistance to the sheet, but in addition, must meet essential requirements as to its physical and chemical behavior at high temperatures. The foam compositions applied to the felt in accordance with the invention must be heated to elevated temperatures in order to cure the foam. In the case of the application of a foam rubber latex, the temperature of vulcanization is normally in the range of 200 to 275° F. When a thermoplastic resinous plastisol composition containing a blowing agent is applied to the felt, heating to a temperature as high as 400° F. is necessary in order to completely decompose the blowing agent in the plastisol and to fuse the composition. Since the foam layer is intimately bound to the felt, the felt sheet itself will attain very nearly the same temperature as the foam. Thus the felt impregnant chosen must be stable at these elevated temperatures. The impregnant should be substantially free of any components which are volatile at these temperatures and it also must not soften to such an extent as to exude from the sheet. In addition, the impregnant should not become embrittled when exposed to high temperatures or be subject to appreciable detrimental chemical changes such as oxidation.

Suitable impregnants which possess these qualities include such resinous materials as the vinyl resins such as polyvinyl chloride, polyvinyl acetate, polymerized vinylidene chloride, mixtures and copolymers of these with each other and with other monomers, polymerized acrylic acid and its copolymers, polystyrene, butadiene-styrene copolymer, butadiene-acrylonitrile copolymer, polymerized chloroprene and the like. Thermosetting resins which under the influence of heat cure by polymerizing and cross-linking can also be used as impregnants. Such resins as phenolic resins, polyesters, oleoresinous materials, such as natural and synthetic drying oils and the like, isocyanates, polyurethanes and the like are suitable.

The conventional impregnant used in the manufacture of felt backed surface coverings is asphalt. Asphalt is a desirable impregnant in view of its low cost, but it has undesirable high temperature properties in view of its relatively low softening point. When a foam is cast upon asphalt saturated felt and thereafter subjected to heat to cure the foam composition, undesirable exudation and bleeding of the asphalt can occur. In such instances, the surface of the felt upon which the foam is cast can be coated with seal coats to act as a barrier against asphalt migration. Such resins as butadiene-styrene copolymer, vinylidene chloride-vinyl chloride copolymer and the like can be used as binders in the formulation of coating paints which provide a good seal against asphalt migration. The use of a felt impregnant which does not bleed, such as the resinous impregnants disclosed above, will eliminate this difficulty.

The impregnant can be incorporated into the fibrous sheet by passing the sheet through an emulsion of solution of the resin followed by drying of the sheet to remove the solvent. Alternately, the resin can be added in fine particles to the fibers prior to sheet formation either as solid particles of resin or as an emulsion in water of other fluid.

The strength and tear resistance of impregnated felted cellulose fiber sheets can be quantitatively evaluated by means of conventional test procedures which are widely used in the felt and paper industry. The tensile strength of felt is conventionally determined by a procedure known as the Scott tensile test. In this test a strip of felt exactly 1 inch in width and with straight parallel sides is held between two jaws in a constantly increasing amount until the sheet breaks. The amount of force applied at the point of breaking is the Scott tensile value of the sheet. The test is most conveniently carried out using apparatus manufactured by H. L. Scott Company, Providence, Rhode Island, using a procedure similar to ASTM method D-828-48 as described on page 948 of part 7 of the 1955 edition of ASTM Standards. Felted fibrous sheets to which a layer of foam is applied in accordance with the invention must have appreciable strength even after being bent. This property can be evaluated to determine what is referred to as the Bent Scott value. In this test a piece of felt exactly 1 inch in width and with parallel sides is bent exactly 90° in each direction at the same point. The sample after being straightened is then placed in the Scott tensile apparatus and its tensile strength is established. The resistance of a felt sheet to tear can be quantitatively determined by a test procedure known as the Finch tear test. This test measures the force required to start a tear in the edge of a sheet of the material being tested. The Finch tear apparatus and method is carried out in accordance with ASTM Method D-827-47 as set forth on page 945 of part 7 in the 1955 edition of ASTM Standards.

It has been found that felted cellulose fibrous sheets having minimum strength values as follows can be used in the invention:

| | Lbs. |
|---|---|
| Scott tensile | 50 |
| Bent Scott | 35 |
| Finch tear | 15 |

When a foam layer is applied to an impregnated felted fibrous sheet having strength values below those listed in the above table the sheet will break or tear when it is subjected to the strains required in the production of products in accordance with the invention and will thus be unsatisfactory.

The thickness of an impregnated felted cellulose fibrous sheet having the strength values indicated in the above table varies somewhat depending on the particular source of cellulose used in the formation of the sheet. Where a sheet is formed from a 100 percent rag furnish a thickness of 0.015 inch will have strength values equal to or above the minimum values. Where the furnish is made up principally of wood pulp fibers a sheet thickness of 0.025 inch is required to maintain the minimum strength values. In general it is preferred that the thickness of the felt be maintained as low as possible in order to keep the thickness of the finished product within reasonable limits. Thin felt sheets having a thickness of about 0.015 inch are somewhat more difficult to produce on the conventional cylinder sheet forming machines widely used in the felt industry. A practical minimum thickness for such machine is 0.020 inch. It is desirable, therefore, that the felt sheet to which the layer of foam is applied in accordance with the invention have a thickness between 0.020 and 0.030 inch with the particular furnish and impregnating system being chosen so that the sheet will have strength values above those listed in the table.

After the resinous composition layer has been cast upon the felt either as a foam or as a thin uniform layer of a foamable composition containing a blowing agent, the mass is then subjected to heat. In the case of a foam rubber this heat treatment is necessary to vulcanize and cure the foam. In the case of a thermoplastic resinous composition the heat treatment is necessary to fuse the resin, a process wherein the individual minute particles of resin become solvated by the plasticizer. In addition, where a foamable composition containing a blowing agent has been applied to the felt, the heat treatment is required in order to decompose the blowing agent in the composition. Heat can be by any of the conventional techniques used for high temperature treatment of sheet material, that is, radiant heating elements can be used or the sheet can be passed through a conventional hot air oven maintained at the desired temperature. After the product is removed from the oven it is then cooled in order that the foam structure will not become damaged as a result of the subsequent lamination to the felt backed surface covering. Cooling can be effected by permitting the product to stand exposed to the air for a sufficient length of time or, alternately, streams of cool air or other gas can be blown directly over the product.

The final step required in the production of products in accordance with the invention is the lamination of the side of the felt opposite to that bearing the foam to the felt backing of a conventional felt backed surface covering. The invention is directed to improvements in felt back surface coverings in general and the particular type of surface covering product can be any of those well known in the art. Typical felt backed surface coverings include linoleum, which comprises a layer of oxidized and polymerized pigmented drying oil-resin blend bonded to a felt backing. Another common type of felt backed surface covering comprises a layer of pigmented plasticized thermoplastic resinous composition formed on a felt backing. Such resins as polyvinyl chloride, vinyl chloride-vinyl acetate copolymer and the like are widely used. Decorative effects can be created by any of the conventional techniques such as molding, pressing or calendering. A further type of felt back surface covering comprises a printed decorative wearing surface formed on a felt sheet. Printing can be by flat bed printing technique or by other techniques of printing such as the silk screen printing process or rotogravure printing. In some instances a thick printed film is applied so that the product has satisfactory wear resistance without application of additional materials. In the case of a printed decorative film applied by rotogravure printing, a clear layer of wear resistant composition is applied to the printed product in order to insure satisfactory life of the product when installed.

In accordance with the invention, a felt backed surface covering is adhesively laminated to a sheet of felt bearing a thin layer of foam. In the lamination process the adhesive layer can be applied to either the felt bearing the foam or the felt bearing the decorative wearing surface or in some cases to both sheets of felt. The particular adhesive used is not critical. Any adhesive formula which is capable of firmly bonding two felt sheets together is suitable. Typical adhesives include thermoplastic adhesives such as polyvinyl acetate, polyvinyl chloride, polymerized acrylic acid, polymerized and copolymerized derivatives of acrylic acid such as ethyl acrylate, and the like either as an emulsion in water or other dispersing medium or dissolved in a compatible organic solvent. Rubber cements, such as emulsions and solutions of natural rubber, butadiene-styrene copolymer, butadiene-acrylonitrile copolymer, chlorinated rubber, polymerized chloroprene and the like either with or without the presence of added tackifiers are also useful. An example of a particularly effective adhesive is a blend of an emulsion of butadiene-acrylonitrile copolymer (Hycar, manufactured by B. F. Goodrich Chemical Company, Cleveland, Ohio) and an emulsion of a thermoplastic resinous fraction derived from pine wood having a softening point of 234° (Vinsol, manufactured by Hercules Powder Company, Wilmington, Delaware). Adhesives of this type are disclosed in U.S. Patent 2,757,711 to R. K. Petry et al.

The adhesive is applied to either or both felt surfaces by any of the conventional techniques such as roller coating, doctor knife application and the like. After application, the adhesive coated felt or felts are subjected to such treatments as are conventional in the adhesive application art depending on the particular adhesive used. For example, when adhesives of the type disclosed in U.S. Patent 2,757,711 are applied, the adhesive layer is heated to evaporate the water in the emulsion and render the layer tacky.

After the treatment of the adhesive film, the two felt sheets are laminated. Lamination is most commonly brought about by passing the two sheets together to the nip between two rolls. This method has the advantage of being continuous. Alternately pressure can be applied in a flat bed press.

The product produced in accordance with the invention comprises a decorative wearing surface, a backing layer of resilient foam, and two interposed adhesively bonded layers of felt. The production of products in accordance with the invention offers numerous advantages over techniques of the prior art. Any waste resulting from faulty performance of the foam application step involves merely scrapping the foam and the felt to which it is applied. There is no loss or waste of any of the decorative surface covering product. The heating step required in the cure and foaming subjects only the foam and the felt to which it is applied to heat. There is, therefore, no possibility of distortion or degradation of the decorative wearing surface of the surface covering product. In addition, the invention provides a method for producing a foam backed surface covering in which the foam is not subjected to detrimental heating and mechanical operations after it has been formed. Also, since the foam is cast upon a backing with appreciable strength and resistance to stretch, there is no chance for the foam to become distorted and torn during application to the surface covering product.

The invention has been described with reference to the lamination of the foam backed felt to the felt backed decorative surface covering by lamination techniques carried out in the manufacturing plant. It is apparent, however, that lamination can be carried out simultaneously with installation. That is, the felt sheet bearing the foam layer can be adhesively bonded to a floor with the felt side exposed. This felt can then be coated with adhesive and the decorative surface covering such as linoleum, can be bonded thereto. Weighted rollers, sandbags and other conventional installation techniques can be used to insure a firm bond between the layers. The felt sheet bearing the uniform foam layer thus replaces the lining felt conventionally used in the installation of smooth surface floor coverings.

The following examples are given for purposes of illustration:

Example I

A rubber latex of the following composition was whipped into a froth by violent agitation in the presence of air:

|  | Parts by weight (dry) |
|---|---|
| 62% solids natural rubber latex | 100 |
| 20% potassium oleate soap | 1.8 |
| 50% zinc diethyldithiocarbamate | 1.0 |
| 60% sulfur dispersion | 2.0 |
| 50% zinc salt of mercaptobenzothiazole | 1.5 |
| Phenyl-β-naphthylamine dispersion | 1.0 |

After the whipping process, 5.0 parts of zinc oxide as a 50 percent dispersion and 2.0 parts of sodium silicofluoride as a 20 percent dispersion were added to promote gelling.

The mass was applied by doctor blade coating in a uniform layer having a thickness of 0.045 inch upon one surface of a sheet of felted cellulose fibers having a thickness of 0.025 inch. The felt sheet was uniformly impregnated with 8 percent polyvinyl acetate and 30 percent light colored petroleum resin, the percentages being based on the weight of dry felt. The felt sheet had a Scott tensile of 60 pounds, a Bent Scott of 40 pounds and a Finch tear of 19 pounds.

The foam layer upon the felt was then subjected to a temperature of 250° F. for 30 minutes to cure and vulcanize the foam rubber. The resulting foam layer had a density of 14 pounds per cubic foot.

The felt side of a sheet of conventional linoleum floor covering (felt sheet =0.040 inch; wear layer =0.052 inch) was coated with a blend of 70 parts butadiene-acrylonitrile copolymer latex (50 percent solids) and 30 parts hard pine resin emulsion (50 percent solids). The coated side of the felt was heated to 240° F. to dry and tackify the adhesive coating by passing under infra-red lamps. The tacky coated felt was then laminated in a rotary laminating unit to the felt sheet containing the layer of cured foam rubber. The product was made up of a decorative linoleum wear layer and a resilient foam rubber backing with two adhesively bonded sheets of felt.

*Example II*

A rubber latex as shown in Example I except for the addition of 60 parts of finely divided clay as a 60 percent dispersion was whipped into a foam. After the incorporation of gelling agents as in Example I, the mass was doctored onto a sheet of impregnated felted cellulose fibers of the type disclosed in Example I. The foam was vulcanized by exposure to a temperature of 250° F. for 30 minutes. The resulting layer of vulcanized foam had a density of 16 pounds per cubic foot.

The foam side of the foam backed felt was adhesively secured to a floor using linoleum paste. A layer of linoleum paste was then applied to the exposed felt surface and the felt side of standard linoleum was applied thereto. The linoleum wear surface was rolled in the conventional manner using a weighted roller and the seams were sandbagged. After 24 hours the installation was ready for use. The floor was quiet underfoot and possessed marked resilience by virtue of the foam layer.

*Example III*

A foamable resinous plastisol composition with the following composition was formulated:

| | Parts by weight |
|---|---|
| Polyvinyl chloride | 100 |
| Didecyl phthalate | 100 |
| Stabilizers | 5 |
| Azodiformamide blowing agent | 3 |

The plastisol was doctored upon a sheet of impregnated felt of the same type used in Example I to provide a clear unblown film having a thickness of 0.010 inch. The sheet was then placed in an oven maintained at 390° F. for 2 minutes thereby fusing the resin in the plastisol and completely decomposing the blowing agent to expand the plastisol into a uniform foam having a thickness of 0.050 inch. The density of the foam was 16 pounds per cubic foot.

Chips of pigmented and filled plasticized vinyl chloride composition in contrasting colors were deposited upon a felt sheet having a thickness of 0.040 inch. The felt was uniformly impregnated with 60 parts per 100 parts dry felt of a polymerized ester of tall oil, substantially all the fatty acid content of the tall oil being esterified with pentaerythritol. The chips were consolidated into a smooth layer having a thickness of 0.025 inch in a flat bed press operated at 330° F. and a pressure of 4,000 pounds per square inch.

The felt side of the felt-backed pressed vinyl sheet was coated with a polyvinyl acetate adhesive composition comprising a solution of polyvinyl acetate in methyl ethyl ketone solvent. The coated side was heated to render the adhesive coating tacky and was brought into contact with the felt side of the sheet upon which the foam was cast. The two sheets were bonded in a continuous laminating unit.

The product made up of a smooth vinyl wearing surface, two sheets of adhesively bonded felt and a resilient vinyl foam backing possessed excellent resilience and comfort under foot.

Any departure from the foregoing description which conforms to the invention is intended to be included within the scope of the claims.

What is claimed is:

1. A resilient, smooth surface covering for walls, floors and the like which comprises a flexible sheet of decorative and wear resistant plastic composition, a first flexible impregnated felted fibrous sheet bonded to one side of said composition sheet, a second flexible impregnated felted fibrous sheet adhesively bonded to said first felt sheet, said second sheet having a Scott tensile value of at least 50 pounds, a Bent Scott value of at least 35 pounds, and a Finch tear value of at least 15 pounds, and a uniform layer of resilient, flexible resinous foam formed on the side of said second sheet opposite to that which is adhesively bonded to said first sheet, said foam having a density of about 6 to about 30 pounds per cubic foot.

2. The resilient, smooth surface covering of claim 1 wherein said foam has a thickness of less than 0.1 inch.

3. The resilient, smooth surface covering of claim 1 wherein said foam has a thickness of between 0.04 and 0.06 inch and said second felt sheet has a thickness of between 0.020 and 0.030 inch.

4. The resilient, smooth surface covering of claim 3 wherein the density of said foam is from 12 to 20 pounds per cubic foot.

5. A method of producing a decorative resilient, smooth surface plastic covering for floors, walls and the like which comprises applying to one surface of a flexible sheet of felted fibers having a Scott tensile value of at least 50 pounds, a Bent Scott value of at least 35 pounds and a Finch tear value of at least 15 pounds, a uniform layer of resilient resinous foam having a thickness of less than 0.1 inch and a density of 6 to 30 pounds per cubic foot, heating to set said foam and adhesively laminating the opposite surface of said felt sheet to the back of a second flexible sheet of felted fibers having on its surface a layer of decorative and wear resistant plastic composition.

6. The method according to claim 5 wherein said first sheet of felted fibers to which said layer of foam is applied has a thickness of 0.02 to 0.03 inch, and said resinous foam has a thickness of 0.04 to 0.06 inch and a density of 12 to 20 pounds per cubic foot.

References Cited in the file of this patent

UNITED STATES PATENTS

| | | |
|---|---|---|
| 2,051,168 | Greider et al. | Aug. 18, 1936 |
| 2,325,903 | Blair et al. | Aug. 3, 1943 |
| 2,507,869 | Rothermel | May 16, 1950 |
| 2,589,502 | Lurie | Mar. 18, 1952 |
| 2,628,654 | Alderfer | Feb. 17, 1953 |
| 2,629,678 | Thompson | Feb. 24, 1953 |
| 2,629,919 | Golden | Mar. 3, 1953 |
| 2,744,847 | Orr | May 8, 1956 |
| 2,757,711 | Petry et al. | Aug. 7, 1956 |
| 2,786,759 | Feigley | Mar. 26, 1957 |
| 2,802,765 | Baymiller et al. | Aug. 13, 1957 |
| 2,816,852 | Banks | Dec. 17, 1957 |

FOREIGN PATENTS

| | | |
|---|---|---|
| 781,952 | France | Mar. 4, 1935 |